Figure 1:
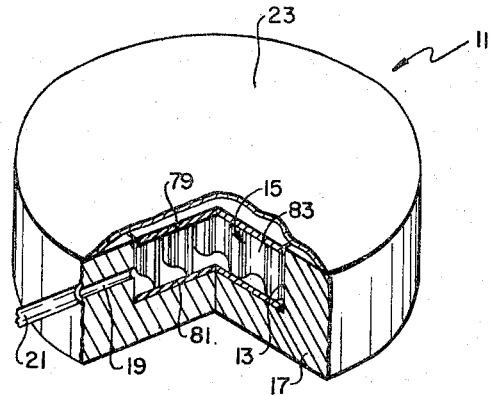

April 16, 1968    P. J. GRIPSHOVER    3,377,695
BONDING PROCESS FOR FABRICATING AND SHAPING STRUCTURES
Filed Sept. 28, 1964    2 Sheets-Sheet 1

PAUL J. GRIPSHOVER
*INVENTOR.*

United States Patent Office 3,377,695
Patented Apr. 16, 1968

3,377,695
BONDING PROCESS FOR FABRICATING
AND SHAPING STRUCTURES
Paul J. Gripshover, Columbus, Ohio, assignor, by mesne assignments, to The Battelle Development Corporation, Columbus, Ohio, a corporation of Delaware
Continuation-in-part of application Ser. No. 298,886, July 31, 1963. This application Sept. 28, 1964, Ser. No. 399,801
2 Claims. (Cl. 29—472.3)

The present invention relates to a method for the solid-phase bonding of metals. More particularly, it concerns a unique method of applying pressure and heat to produce good metallurgical bonds. This is a continuation-in-part of my co-pending application, Ser. No. 298,886, filed July 31, 1963 and now abandoned.

Although the method herein described can be used to produce a variety of structures, the discussion will be concerned mainly with structural panels that are light and strong. Such panels are commonly referred to as "honeycomb sandwich panels." The usual method of producing structural panels is by brazing, a difficult and expensive procedure. The parts of the structure must be carefully assembled and held firmly in place during the brazing operation. A large amount of brazing material is necessary due to the many joints that are to be bonded. Most of the successful brazing procedures are costly and with some forms of brazing material, considerable time is required for applying brazing material to the necessary surfaces. Also, if brazing is to occur, the proper conditions must be carefully controlled. These include cleaning, maintenance of clean parts after cleaning, contact of parts, atmosphere, brazing time and temperature. Some of these conditions are, of course, necessary in any given bonding procedure. The method of this invention, however, reduces the number of conditions and, to some extent, allows more tolerance in those that remain. Solid-phase bonding generally means the bonding of solid metals without adding or otherwise producing a liquid phase between the metals. Solid-phase bonding broadly is old. The usual requirements are that the joints are held together in their proper position under pressure while the parts are heated to a temperature where diffusion will occur. The amount of pressure and temperature varies, with the tempertaure being somewhat dependent on the pressure. The temperature should always be below the point where a liquid phase of the metal would occur if the process is to remain within the definition of solid-phase bonding. There are other processes that use relatively high pressures, but such processes deform the metal parts and unsuitable for honeycomb structures without the use of additional members to support the structural members or hold them in position. High-pressure processes are usually used in cladding or simultaneous forming and bonding operations. In the process of this invention relatively low differential pressure is used (in many cases the total pressure differential is only about equal to atmospheric pressure) and the temperature is dependent upon the particular metal being bonded. In all cases, the temperatures used are appreciably below the melting point of the metals being joined.

One of the most popular processes for obtaining metallurgical bonds has been gas-pressure bonding. This method of joining materials has provided the means of fabricating many material systems which are very difficult to produce by other techniques. Continued use of this process in the future is assured with the ever-increasing demands for fabricating more difficult structures employing materials which require extensive research regarding their properties. Unfortunately, gas-pressure bonding has certain characteristics which restrict its applications. Size limitations and the high cost of operation, resulting in an expensive price per part, are among the two outstanding restrictions. Because pressure as high as 10 to 15,000 p.s.i. is used in gas pressure bonding, the entire volume between the cover plates must be filled with spacers during fabrication. If the areas were comprised of ribs alone, the high pressure would crush the cover panel between the ribs and collapse the ribs. Where spacers are used, they must be selectively removed after fabrication by chemical or mechanical means. This is a difficult and tedious operation particularly for structures having a complex geometry. Growing demands for larger and more complicated structures indicate the need for an improved process.

One of the objects of this invention is to provide an improved process for solid-phase bonding of metals wherein heat and relatively low pressure are applied to the structures to be bonded.

Another object of this invention is to provide an improved process for solid-phase bonding of metal reinforced structures wherein maximum pressures may be exerted at the metal-metal interfaces without collapse of the reinforcement or facing panels.

Still another object of this invention is to provide an improved process for solid-phase bonding of metal reinforced structures wherein reinforcing members can be bonded to a face plate without the use of intermediate sacrificial support members during fabrication.

A still further object of this invention is to provide an improved process for solid-phase bonding of metals wherein metal flow is selective.

Another object of this invention is to provide an improved process for solid-phase bonding of metal reinforced structures wherein bonding of the members of the structures and forming of the structures can be accomplished in one operation.

The process described herein has been named the Thermo-Vac Process. The Thermo-Vac Process is similar to gas-pressure bonding in that it makes use of pressure and temperature to facilitate bonding. One of the important characteristics of the present process is the development of satisfactory interfacial pressures, accomplished by transmitting an applied load to a small area, thereby increasing the pressure on that area. The pressure producing the interfacial pressure is sufficient to bring the components into intimate contact and, thus, to allow bonding by diffusion across the interface.

The method of this invention not only produces bonds of good strength but has a number of inherent advantages that are present because of the particular process employed. The use of a vacuum to produce the pressure for bonding causes the oxide films on certain metals such as molybdenum, tungsten, and copper to be removed by outgassing. These metals can be used in the specimen without the usual meticulous cleaning procedures that are necessary in most bonding methods. The outgassing also eliminates many foreign materials that might be necessary to remove in conventional bonding processes. In addition, certain diffusion aids can be used in the specimen. A thin layer of titanium, for example, in the form of a paint, acts as a "diffusion aid" with columbium for example, so that the bonding can occur in a much lower temperature range than is required for pure columbium. This is quite different from a brazing material, which actually forms the bond and still requires a high temperature to produce good joints. The amount of diffusion aid required to produce the bond is much smaller than the amount of braze material required to produce a brazed joint. The titanium, as a diffusion aid, does not produce the bond but induces the parent metal to diffuse at a lower temperature so that the bond is formed from the parent metal. Other advantages will be apparent from the description that follows, the drawings, and the claim herein.

Figure 3:
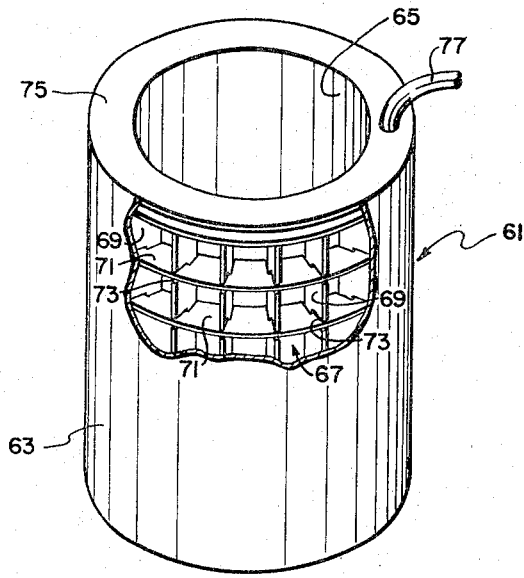
Figure 2:
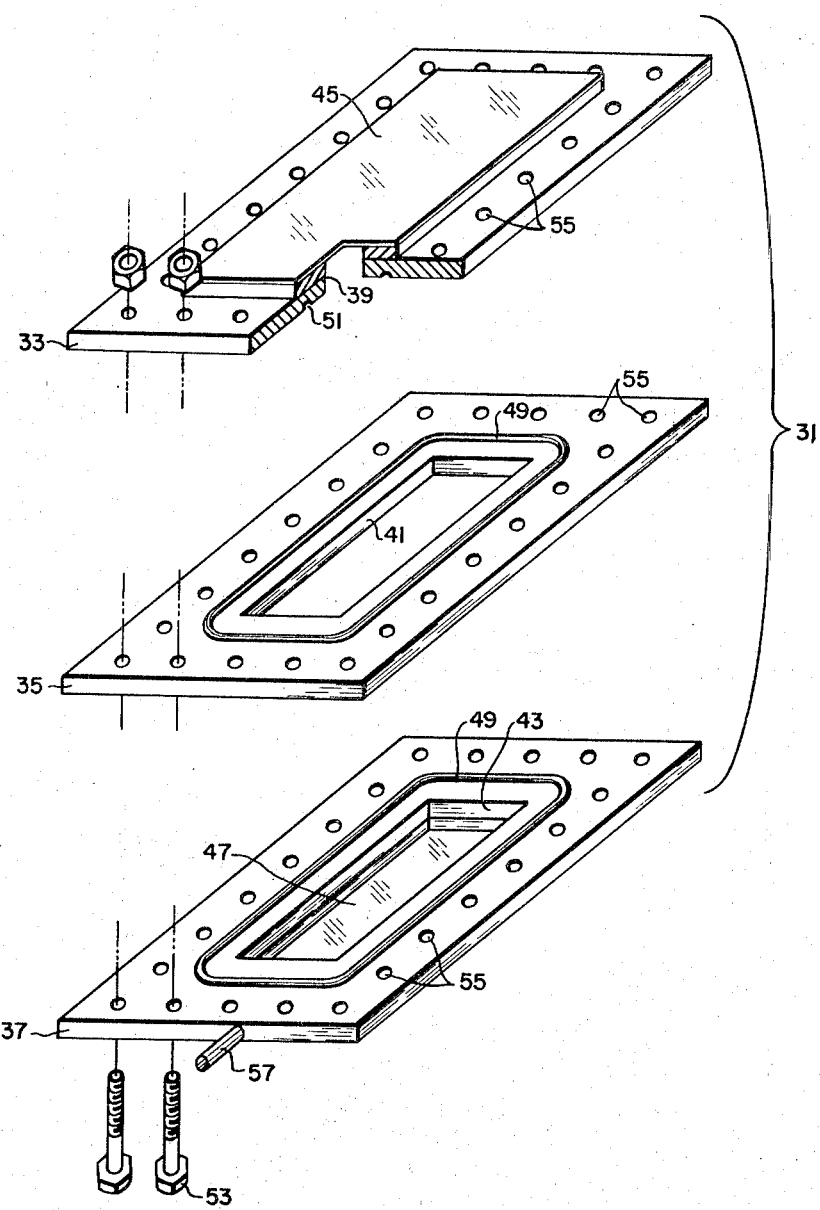

In the drawings:

FIG. 1 is a perspective view of a container for the Thermo-Vac Process having a portion cut away to show a specimen positioned within the unit;

FIG. 2 is a perspective view of a disassembled container for the Thermo-Vac Process that is capable of being adapted to specimens of different thicknesses (a portion of one section is cut away to show its construction); and FIG. 3 is a perspective view of a specimen fabricated by the Thermo-Vac Process without the use of a container (a portion of the outer layer is cut away to show the inner structure).

To accomplish bonding by the Thermo-Vac method using a container, a rather straight-forward setup may be used. The equipment involves a vacuum-tight container that has a cavity large enough to accommodate the speciment. The container is constructed as a rigid enclosure with at least one side of the cavity left open. After the specimen is placed inside the cavity in proper position, a thin lid is placed over the open side or sides of the cavity and sealed by convenient means, such as welding, or the use of high-temperature metallic seals. After a vacuum-tight seal has been made, the gas in the cavity is pumped out to produce a vacuum. The force of the external pressure on the thin lid is transmitted to the specimen, either by direct contact with the specimen or through rigid spacers positioned between the lid and the specimen. The total force of the external pressure is imposed upon the bonding interfaces and, since the bonding interfaces are of a much smaller area than the lid, the resulting pressure at the interfaces is much larger per unit area. The stress level applied at the interfaces should be about equal to the yield strength of the metal at the temperature that is being fabricated. The exact amounts of pressure obtained at the metal to metal interface can be obtained simply by multiplying the ratio of the surface area of the lid to that of the bonding interface by atmospheric pressure where a full vacuum is used. In some cases, this pressure will be found to be greater than the yield strength of the bonding materials. Thus, flow in of the lid or collapse of bonding ribs will be likely. These hazards can be avoided by simply backfilling the thermo-vac container with gas so that the pressure differential is as low as only a few inches of water. This procedure may be necesssary where extremely thin ribs are used or when low yield strength metals are employed. In some cases, it may be found that atmospheric pressure will not enable the practitioner to obtain interfacial pressures near the yield strength of the bonding materials. In this case the atmospheric pressure may be supplemented by pressure means applied to the thin lid. Because these pressures are not higher than about 750 p.s.i., relatively simple means may be employed to apply pressure, such as welding a heavy plate to form a dome-shaped pressure chamber above the thin lid or a portion thereof.

The specimen within the container, which is still connected to the vacuum pump or the like, is heated to an elevated temperature. Greater force efficiency results from the increased plasticity of the heated lid and diffusion takes place across the contact areas of interfaces. The specimen can economically be held under these bonding parameters until complete metallurgical bonds have been achieved.

In those cases where supplemental pressure is used, it may be desirable to place the container assembly in a pressurized autoclave. A large low pressure autoclave is most suitable since heat transmitted to the walls of the autoclave from the heated container is minimized.

The container for the specimen, or thermo-vac container, can be made rather simply. The essential elements are a leak-proof structure surrounding a space for the specimen with a thin lid and an opening for evacuating the space. Examples of thermo-vac containers are shown in FIGS. 1 and 2.

FIG. 1 shows a thermo-vac container 11 with portions cut away to illustrate the relationship of the various parts. A specimen space 13 corresponding to the shape of a desired specimen 15 is hollowed out of a block 17. A passage 19 is made through the block connecting the interior to the exterior of the block 17 and evacuating tube 21 is attached by suitable means such as welding. A lid 23 is placed over the open side of the block 17 after the specimen 15 has been positioned inside the block 17. It is important that the specimen space 13 be well sealed in order to maintain a low pressure in the space 13 after one begins to evacuate the container 11 through the tube 21. One very good method of ensuring an adequate seal is to weld the edges of the lid 23 to the periphery of the block 17. Note that the specimen 15 protrudes slightly from the block 17 so that the lid 23 contacts an entire surface of the specimen 15 which results in atmospheric pressure being transferred evenly over the specimen 15 after evacuation.

The thermo-vac container including the specimen is heated to bonding temperature while maintaining a vacuum or near vacuum within the container 11. One of the most convenient methods of heating the container 11 is by placing it in a high-temperature furnace. The container 11 is maintained at bonding temperature until the specimen 15 within reaches the bonding temperature and until there has been sufficient time for diffusion to occur and for metallurgical bonds to form. The exact temperatures and times will depend on the metal or alloy used in the specimen and illustrative values for various types of specimens are given in the examples that follow.

Another form of thermo-vac container 31 is shown in FIG. 2. This embodiment is made up of a series of units 33, 35 and 37. Each unit 33, 35, and 37 has a central opening 39, 41 and 43, respectively. When the units 33, 35 and 37 are assembled by laying one on top of the other, the central openings 39, 41, and 43 form a space for the specimen. The end units 33 and 37 each have a lid 45 and 47, respectively, covering one side of the central openings 39 and 43. Around each of the central openings 39, 41 and 43 is a seal which is either a metallic embossment 49 or a groove 51 which fits over the embossment 49. The embossment 49 is preferably constructed from a copper rod which is positioned around the central opening 41 and 43 and then welded in place. The size of the specimen determines the number of units that will be used. The units 33, 35, and 37 are assembled by mating the seals and fastening them together with bolts 53—53 that are passed through the openings 55—55 around the periphery of each unit 33, 35 and 37. The depth of the space formed by the central openings 39, 41, and 43 is determined by the number of units assembled together. For example, the therma-vac container 31 may be made up of only the two outer units 33 and 37 or more than one intermediate unit 35 may be used. Air is removed from the specimen space through a tube 57 that communicates with the central opening 43 of the bottom unit 37.

FIG. 3 shows an example of a specimen 61 for bonding without a thermo-vac container. The specimen 61 is the type of construction that might be employed in the fabrication of rocket motor cases. The specimen 61 has a cylindrical outer skin 63 and a cylindrical inner skin 65 arranged with respect to each other to form an annular space 67. Positioned in the annular space 67 between the two cylinders 61 and 63 are a plurality of longitudinal structural members 69—69 and a plurality of circumferential structural members 71—71. Preferably these numbers 69—69 and 71—71 are arranged in an "egg crate" structure, i.e., having matching slots 73—73 so that the members can cross each other at substantially right angles. Each end of the annular space 67 between the cylinders 63 and 65 is sealed off with an annular ring 75. At one end of the specimen 61, a tube 77 passes through the annular ring 75 and communicates with the annular space 67.

After the annular rings 75—75 have been sealed gas tight at each end of the annular space 67, the gas is pumped from the specimen 61 through the tube 77. With the pumping system still connected, the specimen is then placed in a furnace and heated to bonding temperature where it is held until sufficient time has elapsed for bonding to occur.

A panel-type structure is shown in FIG. 1 and consists of two cover sheets 79 and 81 which are separated by thin ribs or structural numbers 83—83. The ribs 83—83 extend the length of the specimen space 13. The ribs 83—83 may be corrugated which allows the rib to stand upright by itself or spacers may be used to support straight ribs 83—83. The number and spacings of the ribs 83—83 may be varied from a few ribs to a full honeycomb structure. The corrugations, when used, serve several purposes. First, they are used to create the desired structure, a type of honeycomb; second, they strengthen the rib, increasing its resistance to buckling and creeping; and third, they provide a means of keeping the rib vertical without the use of spacers. The ribs 83—83 may also have matching slots to form an "egg crate" structure.

The panel-type structure may also be made without the thermo-vac container by simply putting sealing strips around the spaces between the edges of the two cover sheets 79 and 81 and passing a tube through one of the sealing strips to evacuate the space between the cover sheets.

If it is desired, the thermo-vac container may be quite large and the specimen small so that the flexible lid 23 (FIG. 1) has a much larger area as compared with the top cover sheet of the specimen. This allows more pressure to be applied to the specimen because of the large difference in the areas.

Simultaneous deformation to shape and bonding can be carried out by the method of this process. In this embodiment, a spacer can be machined on its surface so that its surface presents a die configuration. The spacer is positioned in the bottom of the thermo-vac container and the specimen placed on top of it. The edges of the specimen should be slightly higher than the wall of the thermo-vac container so that the lid contacts the cover plate of the specimen along its perimeter. Pressure is applied to the cover sheet from the lid during the run and the specimen conforms to the shape of the spacer. Similarly the bottom of the thermo-vac container may be machined to the desired configuration. The top cover plate may also be of any configuration. In this case the cover lid is machined to conform to the desired shape of the cover plate and appropriate pressure is applied. The configuration of the cover plate may also be mated with an opposing configuration so that a flat surface is presented for the pressure application.

Where ribs are not vertical between the cover sheets, it has been found desirable in some cases to use supporting members during the fabrication. For instance, ribs having a continuous "accordion" configuration so that their surface presents an angle of, say, 60° to the cover plates can be fixed at their ends. Vertical supporting members can easily be placed to conform to the apex of the converging ribs. These may be made of a high-expansion material that can be readily removed following bonding and subsequently re-used. Usually, they can be readily removed and re-used by applying a twisting torque to remove them.

Some structural panels are produced with heavy ribs intermediate to a network of honeycomb of ribs of thinner cross-section. These can be produced with a slight modification of the method of this process. Pressure is used to achieve bonding at the interfaces of the cover panels and the thinnest ribs. Spot loading is used to increase pressure at the heavier ribs. The spot loading may be accomplished in a variety of ways. In one embodiment opposing rams of refractory materials enter the heating furnace during bonding to apply pressure preferentially at the heavier ribs. Another method is to weld a small dome shaped pressure chamber to the lid at the portion of the assembly where the heavier ribs are located. The exact method will, of course, vary with the pressure needed and the configuration of the final bonded assembly.

In the first nine examples that follow, the specimens were panel structures using two cover panels. Example 6 demonstrates the use of the method of this process for bonding dissimilar metals in a panel structure having two cover panels. It is possible to use one panel with a number of structural members or ribs. The use of supplemental pressures is also shown by certain of the examples.

*Example 1*

Cover sheets were 18-mil thick 304 stainless steel. Eight ribs of 10-mil thick 304 stainless steel were arranged in four pairs between the two cover sheets to form four lines of closed hexagonal cells. The over-all dimensions of the specimen were 0.236 inch x 8.75 x 8.75 inches. A barrier coating of MgO was applied to the outside of the top cover sheet to prevent the thermo-vac lid from bonding to the cover sheet. After the specimen was placed in a thermo-vac and the air removed, the specimen was subjected to a temperature of 2000° F. for one hour. The bonded areas showed good metallurgical bonds with large grains produced by high-temperature annealing across the bond interface.

*Example 2*

The cover sheets were 18-mil thick 304 stainless steel. Eight ribs of 10-mil thick 304 stainless steel were arranged in four pairs between the two cover sheets to form four lines of closed hexagonal cells. The overall-dimensions of the specimen were 0.236 inch x 8.75 x 8.75 inches. A barrier coating of MgO was applied to the outside of the top cover sheet to prevent the thermo-vac lid from bonding to the cover sheet. After the specimen was placed in the thermo-vac, a spacer ⅛ inch thick of stainless steel was placed between the cover sheet and thermo-vac lid to test the effect of the spacer between the cover sheet and the lid. The air was removed and the specimen was subjected to a temperature of 2000° F. for one hour. The bonded areas showed good metallurgical bonds with large gains produced by high-temperature annealing across the bond interface.

*Example 3*

The cover sheets were 304 stainless steel, 18-mil thick. Twenty-nine ribs of 10-mil thick 304 stainless steel were arranged between the cover sheets in pairs to form a full honeycomb structure of closed hexagonal cells. The overall dimensions of the specimen were 0.236 inch x 4.0 x 4.0 inches. The specimen was placed in the thermo vac and a MgO coated spacer was positioned between the cover sheet and thermo vac lid. The air was removed from the thermo vac cavity and the specimen subjected to a temperature of 2000° F. for two hours. Although there was some discoloration of the outer surfaces of the specimen due to the outgassing of the MgO coating, the surface of the stainless steel within the closed hexagonal cells was very shiny and contamination-free. All surfaces of contact in the specimen showed good metallurgical bond.

*Example 4*

The cover sheets were 5-mil thick 304 stainless steel. Thirty ribs of 5-mil thick 304 stainless steel were arranged in pairs to form a full honeycomb structure of closed hexagonal cells. The overall dimensions of the specimen were 0.210 inch x 4.0 inches x 4.0 inches. The specimen was placed in a thermo-vac and an MgO coated spacer was positioned between the cover sheet and the thermo-vac lid. The air was removed from the thermo-vac cavity and the specimen was subjected to a temperature of 2000 F. for one hour. All surfaces of contact in the specimen showed good metallurgical bonds.

*Example 5*

The cover sheets were 18-mil thick 304 stainless steel. Thirty ribs of 5 mil thick 304 stainless steel were arranged in pairs to form a full honeycomb structure of closed hexagonal cells. The over-all dimensions of the specimen were 0.236 inch x 4.0 inches x 4.0 inches. The spacer was placed "beneath" the specimen that had been machined to design a curvature in the specimen. The change in height of the spacer was 100 mils. The purpose was to determine if the ribs and cover sheets would deform simultaneously during bonding. After the thermo-vac cavity was evacuated, a specimen was subjected to a temperature of 2000° F. for one hour. The specimen conformed to the curvature of the spacer and formed good metallurgical bonds at the areas of contact.

*Example 6*

One cover sheet was 30-mil thick titanium and the other was 30-mil thick niobium. Thirty ribs of 10-mil thick titanium were arranged in pairs to form a full honeycomb structure of closed hexagonal cells. The over-all dimensions of the specimen were 0.236 inch x 4.0 inches x 4.0 inches. After the thermo-vac cavity was evacuated the specimen was subjected to a temperature of 1750° F. for one hour. The titanium-to-titanium interfaces showed good metallurgical bonds at the areas of contact, with excellent grain growth across the interfaces. The titanium-to-niobium interfaces also showed good metallurgical bond with large needle-like structures indicating good diffusion of the niobium to the titanium.

*Example 7*

It was desired to produce a structural panel having corrugated rib supports rather than the essentially vertical supports of prior examples. The cover sheets were 18-mil thick 304 stainless steel. Corrugated sheet of 304 stainless steel having a thickness of 3 mils was placed between the cover sheets. Inert spacers of molybdenum having a thickness of 20 mils, a length equal to the length of the specimen, and a height equal to the distance from the bottom cover plate to the apex of a corrugation were used to support the corrugated ribs. The overall dimensions of the specimen were 0.236 inch x 4.0 inches x 4.0 inches. The specimen was placed in the thermo-vac container and a MgO coated spacer was positioned between the cover sheet and the thermo-vac lid. After the thermo-vac cavity was evacuated, the specimen was subjected to a temperature of 1975° F. for one hour. After removal of the specimen from the thermo-vac container, 7 of the 13 molybdenum spacers were readily removed by applying a twisting torque with pliers. This was significant in that no precautions were taken to reduce mechanical locking of the spacers and corrugation during bonding. All surfaces of contact in the specimen showed good metallurgical bonds.

*Example 8*

It was desired to evaluate the influence of a positive pressure applied to the thermo-vac lid in addition to that available as atmospheric pressure. The cover sheets were 304 stainless steel, 18-mil thick. Twenty-nine ribs of 10-mil thick 304 stainless steel were arranged between the cover sheets in pairs to form a full hexagonal structure of closed hexagonal cells. The over-all dimensions of the specimen were 0.236 inch x 4.0 inches x 4.0 inches. The specimen was placed in the thermo-vac container and a MgO coated spacer was positioned between the cover sheet and the thermo-vac lid. A heavy plate having a dome-like shape was welded to the thermo-vac cavity and helium was fed to the dome-like container until a pressure on the thermo-vac lid of 30 p.s.i. was established. This provided a total pressure of about 45 p.s.i. on a specimen subjected to a temperature of 2000° F. for two hours. Examination of the specimens showed that there was a slight increase in bond contact area than was the case for the same configuration and materials with pressures applied merely by use of a vacuum. All surfaces of contact in the specimen showed good metallurgical bond.

*Example 9*

It was desired to evaluate the effect of positive pressure on fabrication of Type 304 stainless steel panel having thicker ribs than those previously used. The cover sheets and ribs were 18-mil thick, 304 stainless steel. The ribs were arranged in pairs to form a full honeycomb structure of closed hexagonal cells. The over-all dimensions of the specimen were .340 inch x 2.75 inches x 12.00 inches. The specimen was placed in the thermo-vac container and a MgO coated spacer was positioned between the cover sheet and the thermo-vac lid. A heavy plate having a dome-like shape was welded to the thermo-vac lid. The air was removed from the thermo-vac cavity and helium was fed to the dome-like container until a pressure on the thermo-vac lid of 200 p.s.i. was established. This pressure was maintained while holding the specimen at 2000° F. for one hour. The specimen showed good contact at the rib to cover interfaces. Although there was some evidence of contamination at some interfaces, metallographic examination at uncontaminated areas showed complete grain growth and obliteration of the original interface.

*Example 10*

Two open-end cylinders of 304 stainless steel with a wall thickness of 0.030-inch, one having a diameter of 6 inches and the other a diameter of 5.5 inches were positioned concentric with one another leaving a ¼-inch annular space betwen them. A plurality of ¼-inch wide annular rings 0.018 inch-thick were equally spaced ¼-inch apart throughout the length of the tubes. Each ring had three radial slots to fit three ¼-inch wide slotted strips 0.018-inch thick placed at substantially right angles to the rings to form essentially an "egg crate" structure. Both the rings and strips were of 304 stainless steel. An annular end ring ¼-inch wide and ¼-inch thick was welded onto each end of the cylinder sealing off the annular space. An evacuating tube was placed through one of the ¼-inch annular end rings and the gas removed from the annular space. The specimen was placed in a furnace at a temperature of 2000° F. while still evacuating. After allowing twenty minutes for the specimen to reach the furnace temperature, the specimen was maintained at or near vacuum within the furnace for one hour. Bonding betwene the cylindrical skins and "egg crate" supporting structure was successful.

In summary, the novel features and advantages disclosed in the described examples can be utilized to provide what can be briefly described as an improved process for solid-phase bonding of metals wherein heat and relatively low pressures are applied to produce maximum pressures on a small area at the metal-metal interfaces without collapse of reinforcement or facing panels which would ordinarily necessitate use of sacrificial support members. This process can be readily carried out by evacuating space enclosed by members to be bonded and applying pressure to the specimen while it is appropriately heated and diffusion bonded across the metal interfaces.

It will be understood, of course, that while the forms of the invention herein shown and described constitute preferred embodiments of the inventions, it is not intended to illustrate all possible forms of the invention. It will also be understood that the words used are words of description rather than of limitation and that various changes may be made without departing from the spirit and scope of the invention herein disclosed.

What is claimed is:

1. A method for fabricating and shaping structures having a pair of sheets with structural members metallurgically bonded therebetween such as honeycomb sandwich panels, heat exchangers, and the like, comprising the steps of:
   (a) assembling said sheets in spaced relation to one another with said structural members disposed between said sheets;
   (b) enclosing the assembled sheets and structural members within a container having a thin lid at its top and a die configuration at its base, said thin lid in being in pressure-transmitting relationship with said assembled sheets and structural members and said die configuration supporting at its edges said assembled sheets and structural members;
   (c) removing the gases from said container thereby reducing the pressure in said container below atmospheric pressure whereby atmospheric pressure acts on said thin lid pressing said sheets against said structural members;
   (d) heating said container to the bonding temperature of said sheets and said structural members while maintaining the space in said container below atmospheric pressure;
   (e) applying supplemental pressure to said pressure transmitting lid so that the pressure at the interface of said sheets and said structural members exceeds the yield strength of the metal being bonded at the temperature of bonding; and
   (f) maintaining said container at bonding temperature and pressure for a period of time sufficient to allow metallurgical bonds to form between the edges of said structural members and said sheets and to allow said structural members and said sheets to conform to said die configuration.

2. A method of fabricating and shaping structures having a pair of sheets with structural members metallurgically bonded therebetwene, such as honeycomb sandwich panels, heat exchangers, and the like, according to claim 1, wherein said sheets and structural members are covered with a thin coating of a diffusion aid, allowing said structure to be bonded at a temperature lower than the usual bonding temperature of the metal comprising said structure.

References Cited

UNITED STATES PATENTS

| | | | |
|---|---|---|---|
| 2,820,286 | 1/1958 | Andrus | 29—497.5 X |
| 2,894,322 | 7/1959 | Clair | 29—470.1 |
| 3,009,241 | 11/1961 | Giovannucci | 29—501 X |
| 3,011,254 | 12/1961 | Melill | 29—497.5 X |
| 3,041,718 | 7/1962 | Stuchbery | 29—480 X |
| 3,067,507 | 12/1962 | Titus | 29—497.5 X |
| 3,145,466 | 8/1964 | Feduska | 29—502 X |
| 3,170,234 | 2/1965 | Tarr | 29—498 |
| 3,186,083 | 6/1965 | Wright | 29—494 |
| 3,188,732 | 6/1965 | Feduska | 29—494 X |
| 3,222,775 | 12/1965 | Whitney | 29—498 X |

JOHN F. CAMPBELL, *Primary Examiner.*

R. F. DROPKIN, *Assistant Examiner.*